United States Patent Office 3,210,304
Patented Oct. 5, 1965

3,210,304
STYRENE-ACRYLONITRILE COPOLYMERS STABILIZED WITH METALLIC STEARATES
Frederick R. Eirich, Brooklyn, N.Y., and Richard A. Wiinikainen, Leominster, Mass., assignors to Foster Grant Co., Inc., Leominster, Mass., a corporation of Delaware
No Drawing. Filed Oct. 25, 1961, Ser. No. 147,455
10 Claims. (Cl. 260—23)

This invention relates generally to new and improved stabilized polymeric compositions derived by copolymerization of vinyl aryl compounds and acrylonitrile. More particularly this invention relates to new and improved stabilized thermoplastic polymeric compositions consisting of from about 65% to about 80% by weight of at least one vinyl aryl compound and about 35 to 20% by weight of acrylonitrile having incorporated therein one or more metallic stearate stabilizers.

The polymeric compositions of this invention are known as "solvent-resistant resins," viz. resins that are relatively resistant to attack by such liquids as gasoline, alcohol, water, aqueous acids and aqueous bases, even though they are swellable and/or dispersible in such liquids as methyl ethyl ketone. As molding compositions, they are readily moldable by conventional means such as by compression or injection molding, hot pressing, extrusion or the like.

Thermoplastic resinous compositions derived from about 65% to 80% by weight of vinyl aryl compounds and from about 35 to 20% by weight of acrylonitrile are known. These copolymers, which form the basis of the present invention, have average molecular weights such that 10% by weight solutions of the copolymers in methyl ethyl ketone have viscosities between 6 and 40, preferably between 10 and 35, centipoises at a temperature of 25° C. These copolymers usually possess the most desirable combination of mechanical properties, viz. strength, hardness, flexibility, and molding behavior, viz., flow rate, which combination of mechanical properties and molding behavior is related to the average molecular weight of the copolymers.

Several methods of preparing such thermoplastic resinous compositions are known to the art. For example, bulk, solution, suspension and emulsion polymerization techniques have been employed.

Thermoplastic resinous compositions derived from about 65% to 80% by weight of vinyl aryl compounds and 35% to 20% of acrylonitrile generally have good thermal properties as regards dimensional stability. However, it is known that elevated temperatures tend to cause discoloration, i.e., yellowing of these compositions. Such discoloration frequently occurs during the normal processing of the compositions at elevated temperatures. For example, styrene-acrylonitrile copolymers are frequently devolatilized in an extruder after polymerization in order to remove unreacted materials therefrom. Yellowing of the copolymers often results from such extrusion at elevated temperatures.

Most unexpectedly, we have found that the thermal discoloration of polymeric compositions derived from about 65% to 80% by weight of at least one vinyl aryl compound and from about 35% to 20% by weight of acrylonitrile, can be substantially reduced by the incorporation therein of certain metallic stearates. Extrusion and processing of the improved polymeric compositions of this invention does not result in loss of clarity but unexpectedly in production of substantially non-discolored products.

The metallic stearates which can be employed to advantage in the improved compositions of our invention are stearates of metals of the group comprising magnesium, calcium, cadmium and aluminum. Examples of these materials are aluminum hydroxy stearate, aluminum mono-stearate, aluminum stearate, cadmium stearate, calcium stearate and magnesium stearate.

It is important that the stabilizers of this invention be substantially uniformly incorporated in the polymeric composition. Several methods of incorporation of the stabilizers may be employed. If desired, the stabilizer and the solid polymeric composition may be mixed as, for example, on a two roll mill or any other suitable mixing machine adapted to blend solid plastic material. The stabilizer may be added to the monomers prior to or during polymerization. If the polymeric material is to be extruded, the stabilizer may be tumbled with solid particles of the polymeric composition and subsequently further mixed with the polymeric composition during extrusion.

In general the metallic stearate stabilizers of the present invention are employed in amounts of about 0.02% to 0.10% and preferably 0.05 to 0.075% by weight of the polymeric compositions. Higher amounts may be employed; however, negligible additional color improvement is hereby obtained. In some cases the polymeric compositions are undesirably hazy if amounts of stabilizer greater than recited above are employed.

The vinyl aryl compounds which can be employed in preparing the copolymers of our invention include those compounds represented by the following formula:

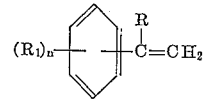

wherein R is selected from the group consisting of hydrogen and the methyl radical, $R_1$ is a substituent selected from the group consisting of chlorine and lower alkyl radicals and $n$ is an integer between 0 and 2. Included are styrene per se, nuclear substituted alkyl styrenes, e.g., o-, m- and p-methyl styrene, 2-4 dimethylstyrene and the like, alpha and beta alkyl substituted styrenes, e.g., alpha-methylstyrene and the like. Mixtures of styrene compounds may also be employed. For example, polymeric compositions derived from about 30 to 75% by weight of styrene, about 5 to 35% by weight of alpha-methylstyrene and about 35 to 20% by weight of acrylonitrile may be stabilized by the stabilizers of our invention.

It should be understood that the polymeric compositions which may be stabilized by the stabilizers of the present invention may be produced by any of the known polymerization methods recited above.

The following examples illustrate the invention, but are not to be construed as limiting. In these examples, parts are by weight unless otherwise specified.

Example 1

To a suitable pressure reaction vessel containing 200 parts of distilled water are added 50 parts of styrene monomer, 15 parts of alpha-methylstyrene monomer, 35 parts of acrylonitrile, 1.4 part of lauroyl peroxide. The monomer mixture is polymerized at a temperature of 80° C. in an inert atmosphere under autogeneous pressure. Calcium hydroxyapatite precipitated by reaction between the required amounts of trisodium phosphate and calcium chloride is used as suspending agent. The degree of conversion is controlled by removal of the unreacted monomer through steam distillation. Upon completion of the polymerization, the polymer beads are thoroughly washed with water and dried in an air drier at 70° C. to 80° C. In the final copolymer there is 25.5% of combined acrylonitrile, by weight of the copolymer. The copolymer beads so formed have a viscosity of 16.2 centipoises when measured as a 10% by weight solution in methyl ethyl ketone at 25° C.

100 parts of the copolymer beads formed are extruded in a conventional 2 inch twin screw devolatilizing extruder having a dwell time of two minutes and an overall stock temperature of approximatelly 430° F. The copolymeric material is extruded in the form of a ⅛ inch diameter strand which is chopped to form pellets of about ¼" length.

The pellets of the copolymer are injection molded into plaques ⅛ inch thick, 6 inches long and ½ inch wide employing a stock temperature of about 440° F. and a molding cycle of approximatelly 35 seconds. The color index number of the plaques formed are listed in the chart below.

In Examples 2–11, listed in the chart below, the stabilizers employed are dry tumbled in a sealed container for 15 minutes with 100 parts of the copolymer beads of Example 1. The resulting mixture is then further treated as in paragraphs 2 and 3 of Example 1. In Example 12 the stabilizer is added to the monomer mixture before polymerization. The resulting polymeric beads were then further treated as in Example 1.

| Example | Stabilizer (parts by weight) | Color Index Number [1] |
|---|---|---|
| 1 | None | 8 |
| 2 | 0.05 aluminum hydroxy stearate | 5 |
| 3 | 0.075 aluminum hydroxy stearate | 4 |
| 4 | 0.11 aluminum hydroxy stearate | ([2]) |
| 5 | 0.05 aluminum mono-stearate | 5 |
| 6 | 0.075 aluminum mono-stearate | 4 |
| 7 | 0.05 calcium stearate | 5 |
| 8 | 0.075 calcium stearate | 4 |
| 9 | 0.075 aluminum stearate | 5 |
| 10 | 0.075 cadmium stearate | 5 |
| 11 | 0.075 magnesium stearate | 5 |
| 12 | 0.075 aluminum mono-stearate | 5 |

[1] Color Index Number: The scale below shows the numbers related to adjacent colors. The plaques of the examples were visually compared with each other and assigned a color index number based on the following scale:
 1, water white
 2, white
 4, very slightly yellow
 6, slightly yellow
 8, yellow
[2] Slightly hazy.

From the examples, it is clear that the employment of the stabilizers of our invention greatly reduces the discoloration of the polymeric compositions employed herein. The resultant composition when employed in thin objects are substantially non-discolored.

The clear, substantially non-discolored compositions of the present invention may find use in the preparation of films, molded or extruded objects wherein a substantially transparent, non-discolored article is desired. For example, clear transparent plastic glasses, bowls, cups, etc. may be formed of the compositions of this invention.

Many changes and alternations may be made without departing from the spirit and scope of this invention which is set forth in the appended claims which are to be construed as broadly as possible in view of the prior art.

We claim:

1. A thermoplastic polymeric composition derived from polymerization of about 65 to 80% by weight of at least one vinyl aryl compound and about 35 to 20% by weight of acrylonitrile, having substantially uniformly incorporated therein from about 0.02 to 0.1% by weight of the composition a thermal color stabilizer which is a stearate of a metal selected from the group consisting of aluminum, calcium, cadmium and magnesium.

2. A thermoplastic polymeric composition derived from polymerization of about 30 to 75% by weight of styrene, about 5 to 35% by weight of alpha-methylstyrene and about 35 to 20% by weight of acrylonitrile, having substantially uniformly incorporated therein from about 0.02 to 0.1% by weight of the composition a thermal color stabilizer which is a stearate of a metal selected from the group consisting of aluminum, calcium, cadmium and magnesium.

3. The thermoplastic polymeric composition of claim 1 wherein said thermal color stabilizer is aluminum hydroxy stearate.

4. The thermoplastic polymeric composition of claim 1 wherein said thermal color stabilizer is aluminum mono-stearate.

5. The thermoplastic polymeric composition of claim 1 wherein said thermal color stabilizer is aluminum stearate.

6. The thermoplastic polymeric composition of claim 1 wherein said thermal color stabilizer is calcium stearate.

7. The thermoplastic polymeric composition of claim 1 wherein said thermal color stabilizer is cadmium stearate.

8. The thermoplastic polymeric composition of claim 1 wherein said thermal color stabilizer is magnesium stearate.

9. The thermoplastic polymeric composition of claim 1 wherein said thermal color stabilizer comprises about 0.05 to 0.075% by weight of the composition.

10. The composition of claim 1 wherein said vinyl aryl compound is styrene.

References Cited by the Examiner

UNITED STATES PATENTS

| | | | |
|---|---|---|---|
| 2,075,543 | 3/37 | Reed et al. | 260—23 X |
| 2,317,137 | 4/43 | Fletcher | 260—23 |
| 2,341,186 | 2/44 | Matheson et al. | 260—23 |
| 2,485,592 | 10/49 | Griess et al. | 260—23 |
| 2,636,867 | 4/53 | Humfeld | 260—23 |
| 2,779,744 | 1/57 | Groff et al. | 260—23 |
| 2,992,199 | 7/61 | Coler et al. | 260—23 |

LEON J. BERCOVITZ, *Primary Examiner.*

MILTON STERMAN, *Examiner.*